No. 851,410. PATENTED APR. 23, 1907.
J. ERICKSON.
ELECTROTHERMAL SWITCH.
APPLICATION FILED OCT. 21, 1904.
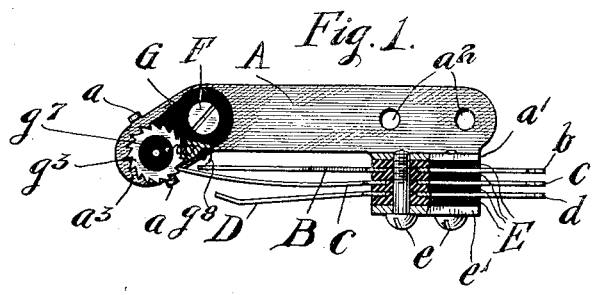
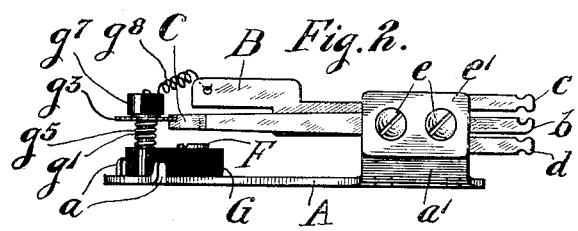
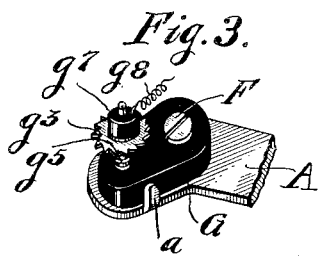
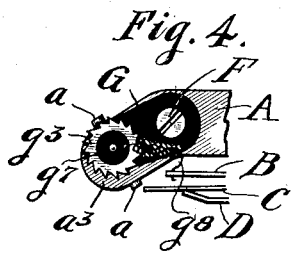 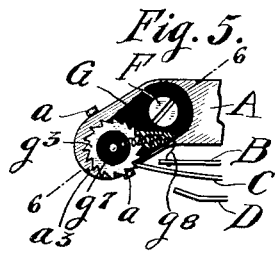 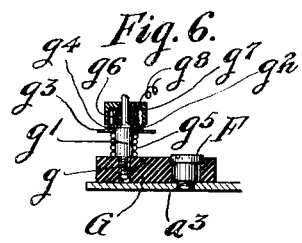
Witnesses.
Inventor:
John Erickson
By Bulkley & Durand
Attorneys.

UNITED STATES PATENT OFFICE.

JOHN ERICKSON, OF CHICAGO, ILLINOIS, ASSIGNOR TO AUTOMATIC ELECTRIC COMPANY, OF CHICAGO, ILLINOIS.

ELECTROTHERMAL SWITCH.

No. 851,410.  Specification of Letters Patent.  Patented April 23, 1907.

Application filed October 21, 1904. Serial No. 229,389.

*To all whom it may concern:*

Be it known that I, JOHN ERICKSON, a citizen of the United States of America, and a resident of Chicago, in the county of Cook and State of Illinois, have invented a certain new and useful Improvement in Electrothermal Switches, of which the following is a specification.

My invention contemplates an improved and highly efficient form of electro-thermally-operated switch adapted more particularly for use in circuits where it is desirable to protect delicate apparatus or electrical devices, such, for example, as telephonic and other like apparatus, against the injurious effects of abnormally strong electrical currents.

In an electro-thermal switch embodying the principles of my invention, provision is made for maintaining the continuity of an electrical circuit, one of the elements for so doing consisting of a resistance of such character that heat will be generated as soon as the current becomes abnormally strong, or as soon as a trespassing current shows its presence in the circuit. The continuity of the circuit is also maintained by certain metallic parts which are normally held in contact with each other by means of a suitable quantity of solder or other heat-responsive material, but which parts are not soldered together. In order that the switch may respond readily to abnormally strong currents, so as to open the circuit before the abnormal flow of current can injure any of the apparatus or instruments to which protection is afforded by the switch, the said resistance and solder or other fusible material are associated closely together. In this way, the circuit is opened by the separation of the metallic parts as soon as sufficient heat is generated by the resistance to soften the solder or other heat-responsive material; and provision is also preferably made whereby the outer or line portion of the circuit is at the same time connected with a conductor leading to ground, whereby the abnormally strong or trespassing current is not only excluded from the apparatus or instruments to be protected, but is also afforded a path of escape to ground.

With the preferred construction, the switch-contacts which are held together through the medium of the solder are separated as soon as the latter softens; but the parts which are soldered together and to which the solder is directly applied do not separate when the switch is operated by an abnormal current. Consequently, the solder or other heat-responsive material serves, as soon as it cools, to again bind or re-solder the parts together; and the arrangement of switch-contacts is such that the same can then be closed or restored to their normal condition without the necessity of removing any of the parts, and without even the necessity of supplying new solder or other fusible material. Thus, after the switch has been operated by abnormal current, it is only necessary to close the contacts for maintaining the continuity of the circuit; and while this self-soldering feature of my improved electro-thermal switch is an important one, it will be seen that the device as a whole embodies various other features which are novel and advantageous.

One of the important features of my invention consists in employing two metallic parts which are normally soldered together, but adapted to move relatively to each other when the solder is melted or softened, and which are adapted to, at all times, exclude the air from the solder, thereby preventing the solder from oxidizing each time it is melted or softened, and thus making it possible to operate the switch hundreds of times without any appreciable loss or deterioration of the solder.

In the accompanying drawings, Figure 1 is a face view of an electro-thermal switch embodying the principles of my invention, a portion of the mounting for the switch-springs being shown in section; Fig. 2 is a side elevation of the device shown in Fig. 1; Fig. 3 is a perspective view of the electro-thermal or heat-responsive portion of the said device; Figs. 4 and 5 are detail views showing the switch-contacts in different positions; Fig. 6 is a section on line 6—6 of Fig. 5.

As thus illustrated, the body A of the switch is preferably and advantageously composed of a sheet-metal stamping provided at one end with the ears or lugs $a$, and at the other end with a flat portion $a^1$. The switch-springs B, C and D, having terminal portions $d$, $b$ and $c$, and with the interposed strips of insulation E, are secured to the portion $a^1$ by means of screws $e$ and a clamping plate $e^1$. At this end of the structure, the said body A may also be provided with screw-holes $a^2$, whereby the device as a whole may be secured to a suitable support. At its other end, the said body A is provided with a threaded opening $a^3$ adapted to receive the threaded end portion of a short screw F. The said screw serves as a pivot for the swinging support or block of insulation G, which latter is adapted to have a limited swinging movement between the stops $a$. A threaded opening $g$ is provided at the free end portion of the said block of insulation, said threaded opening being adapted to receive the threaded end portion of a metallic post $g^1$. As shown, the said post is provided with a flange or shoulder portion $g^2$, and also with a separately formed collar or encircling ring $g^3$, the latter being secured to the flange or shoulder $g^2$ by means of the solder or other suitable heat-responsive material $g^4$. A coil-spring $g^5$ is interposed between the opposing surfaces of the block of insulation G and the flat encircling ring $g^3$. The coil or other suitable resistance $g^6$ is wrapped around the outer reduced end portion of the metal post $g^1$, and is covered by a cap of insulation $g^7$. It will be observed that the ring $g^3$ has its edge or periphery provided with ratchet-teeth, as shown more clearly in Figs. 1, 3, 4 and 5. Normally, the end of the line spring C engages a tooth on the ring $g^3$, as shown in Figs. 1 and 5; and the spring B, which may be a switchboard-spring, is connected with the coil $g^6$ by means of a conductor $g^8$. It will be understood that the other end of the coil $g^6$ is secured in a suitable manner to the metallic post $g^1$, whereby the spring C, the toothed ring $g^3$, the coil or resistance $g^6$, and the spring B are all normally connected in series in the circuit including the apparatus or instrument to be protected. It will be seen that the parts are so relatively disposed, and that the notches of the ring $g^3$ are such, that the tension of the spring C tends normally to hold the block of insulation G against one of the stops $a$.

Suppose now that an abnormal current, such as what is commonly known as a sneak current, or some other trespassing current, should show its presence in the line circuit. In such case, the abnormal condition of the current-flow in the circuit causes the coil or other resistance $g^6$ to generate considerable heat, to thereby soften or melt the solder $g^4$. This, of course, by reason of the character of the said resistance, happens before the current can do any harm to the apparatus or instruments to be protected, and results in a release of the toothed ring $g^3$. The said ring, when thus released, allows the spring C to escape from engagement with the tooth on the ring, and thus opens the conducting path which is normally maintained in a closed or continuous condition by the contact between the said spring and toothed ring. At this juncture, it will be seen that the coil-spring $g^5$ keeps the toothed ring $g^3$ pressed tightly against the flange or shoulder $g^2$; and such being the case, the solder $g^4$ then instantly cools or hardens and thereby resolders the said toothed ring and flange together. In other words, the solder, when softened or melted, simply allows the toothed ring to rotate upon the metal post $g^1$, so as to break the continuity of the conducting path, and then instantly cools or hardens and restores the toothed ring of the said post to its normal or rigid condition. After this, the block of insulation G can then be swung over toward the outer stop $a$, so as to permit the spring C to be bent or sprung into its normal condition, and the block of insulation G then swung back toward the other stop and in such manner as to cause the toothed ring to re-engage the end of the said spring. In this way, it is evident that the electro-thermal switch is of a self-soldering character—that is to say, it re-solders the parts together as soon as the circuit or conducting path is opened; and it is then only necessary to bring the normally-closed switch-contacts into re-engagement with each other in order to restore the switch to its normal condition. As shown, the spring C, when released, engages the spring D; and the said spring D can have its terminal connected with the ground conductor, so as to afford a path of escape for the trespassing current.

The self-soldering feature of my improved electro-thermal switch is an important one, as it obviously makes it unnecessary to in any way repair the switch after it has been operated by an abnormal current-flow. It is evident, however, that, with the improved construction and arrangement shown, the normally-closed conducting path can be easily opened, for any purpose, without removing or detaching any of the different parts. The arrangement of the switch-springs in a group at one end of the body constitutes a further feature of improvement. In addition, I aim to provide a construction of such character that, in its entirety, the switch is not only reliable and efficient in use, but also simple and economical to manufacture; and I also aim to provide a device that is comparatively easy and inexpensive to install and maintain in condition for use.

It is a matter of common knowledge that solder, when exposed to the atmosphere in a melted condition, will be subject to oxidation; but with my improved construction, involving two metallic parts which are maintained tightly in contact with each other, with only a very thin film of solder between them, and which, even when the solder melts, are adapted to rotate or move relatively to each other without exposing the solder to the atmosphere, it is evident that no such oxidizing action can occur; and for this reason, an electro-thermal switch embodying this broad idea or feature of, at all times, excluding the air from the solder, can be operated hundreds of times without injuring the solder, or in any way lessening the efficiency of the switch as a whole.

Any suitable means, such, for example, as the terminals $b$, $c$, $d$, or other devices, can be employed as the means for attaching the switch to circuit wire, and for including the devices in a circuit or circuits—either normally closed or open—or for making other necessary or desired connections.

The toothed ring $g^3$ is, it will be seen, adapted to serve as a rotary detent. Under the influence of the spring $g^5$, and with the relative arrangement shown, this detent is adapted to automatically resume an operative condition upon the cessation of abnormal current conditions in the device of which it is a desirable feature. It is essential, of course, that the parts which are normally soldered together be not only capable of re-soldering themselves together upon the cessation of abnormal current conditions, but that they also be capable of re-soldering themselves together in an operative condition—that is, the condition or relation of the parts to each other, after the solder cools, must be an operative one, and one which leaves the excess current-operated device in condition for use. The switch as a whole, of course, will not automatically restore itself, inasmuch as it is necessary to manually re-set the switch-spring C—that is, to manually bend the end of this spring into engagement with the rotary detent. The excess current-operated device is, however, of a self-restoring nature, inasmuch as the mere cooling or re-hardening of the solder leaves this device, as stated, in condition for immediate use. In other words, the relation of the soldered parts to each other, after the solder has cooled or re-hardened, is an operative one and of such character as to leave the excess current-operated device in condition to be simply re-applied to the switch—that is, to the switch-springs or other circuit-controlling contacts.

What I claim as my invention is:

1. An electro-thermal switch comprising a body composed of a sheet-metal stamping, a group of switch-springs and interposed strips of insulation suitably secured to a portion of said body, a block of insulation pivotally mounted at the other end of said body, a metal post mounted in the free or swinging end portion of said block of insulation, a toothed ring encircling said post and normally soldered thereto, a resistance coil mounted on said post and associated with said solder, said post having a shoulder to which the said toothed ring is soldered, suitable means for connecting the said resistance, toothed ring and one of said springs in series, said spring normally engaging a tooth on said ring, and spring means for keeping the said toothed ring pressed tightly against said shoulder when the solder melts as a result of the heat generated by said resistance, and whereby the toothed ring and spring are separated by the melting of the solder and the toothed ring and metal post then automatically re-soldered together upon the cessation of current through the resistance and the consequent cooling or hardening of the solder.

2. An electro-thermal switch comprising means for preserving the normal condition of a conducting path, said means including a metal post provided with a shoulder, a toothed ring encircling said post and adapted to rotate thereon, the ring and shoulder, however, being normally soldered together, a suitable heat-generating resistance associated with said solder, a spring tending at all times to force the said ring against the said shoulder, and a switch-spring normally engaging a tooth of said ring.

3. An electro-thermal switch comprising a self-soldering heat-coil device, together with suitable switch-contacts operated by said heat-coil device, said heat-coil being adapted to be operated by abnormal current conditions, and to automatically resume an operative condition upon the cessation of abnormal current conditions therein, the said switch having a plurality of axes of movement, one axis adapted to swing about the other to facilitate resetting of the structure as a whole, substantially as described.

4. An electro-thermal switch comprising a body composed of a sheet-metal stamping, a group of switch-springs and interposed strips of insulation suitably secured to a portion of said body, a block of insulation pivotally mounted at the other end of said body, a metal post mounted in the free or swinging end portion of said block of insulation, a toothed ring encircling said post and normally soldered thereto, a resistance coil mounted on said post and associated with said solder, said post having a shoulder to which the said toothed ring is soldered, suitable means for connecting the said resistance, toothed ring and one of said springs in series, said spring normally engaging a tooth on said ring, and spring means for keeping the said toothed ring pressed tightly against said shoulder when the solder melts as a result of the heat generated by said resistance, and whereby the toothed ring and spring are separated by the melting of the solder and the toothed ring and metal post then automatically re-soldered together upon the cessation of current through the resistance and the consequent cooling or hardening of the solder, together with means for connecting the said switch with or in one or more circuits or circuit connections.

5. An electro-thermal switch comprising means for preserving the normal condition of a conducting path, said means including a metal post provided with a shoulder, a toothed ring encircling said post and adapted to rotate thereon, the ring and shoulder, however, being normally soldered together, a suitable heat-generating resistance associated with said solder, a spring tending at all times to force the said ring against the said shoulder, and a switch-spring normally engaging a tooth of said ring, together with means for connecting the said switch with or in one or more circuits or circuit connections.

6. An electro-thermal switch comprising a self-soldering heat-coil device, said heat-coil device being adapted to be operated by abnormal current conditions, but adapted also to automatically resume an operative condition upon the cessation of abnormal current conditions therein, together with means for connecting the said switch in one or more circuits or circuit connections, the said switch having a plurality of axes of movement, one axis adapted to swing about the other, which is stationary to facilitate resetting of the structure as a whole, substantially as described.

7. In an electrical controller comprising thermally operable securing means releasable on a change in electrical circuit conditions, and having provisions whereby it is automatically resecured in operable condition preparatory for another operation, a spring $g^5$ held under permanent tension to ensure self return of the parts to operative condition preparatory to manual restoration to normal condition of the structure as a whole.

8. In apparatus of the class specified, the combination of a heat producing means, a rotary detent normally held against rotation by a heat susceptible material, circuit controlling means adapted to produce a relative turning between the heat producing means and the rotary detent, when the heat susceptible material is softened, a spring $g^5$ held under permanent tension to ensure self return of the parts to operative condition preparatory to manual restoration to normal condition of the structure as a whole, said rotary detent engaged by the spring $g^5$, for the purpose set forth.

9. In an electrical circuit protector, the combination of a heat concentrating device, a wheel having a plurality of teeth, a solder joint normally holding said wheel against movement, a strip spring adapted to engage the teeth of said wheel, whereby upon the passage of an unduly strong current in the device, the heat concentrating device softens the solder and permits the wheel to be turned to release the spring and resets the wheel in position to re-engage the spring, the wheel being automatically resoldered after operation in such reset position, a spring $g^5$ held under permanent tension to ensure self return of the parts to operative condition preparatory to manual restoration to normal condition of the structure as a whole, said wheel, engaged on its under side by said spring $g^5$, for the purpose set forth.

10. In an electrical controller comprising thermally operable securing means releasable on a change in electrical circuit conditions, having provisions whereby it is automatically resecured in operable condition preparatory to another operation, a pivoted arm G upon the distal end of which are mounted the parts capable of self return to operative condition preparatory to manual restoration to normal condition of the structure as a whole.

11. In apparatus of the class specified, the combination of a heat producing means, a rotary detent normally held against rotation by a heat susceptible material, circuit controlling means adapted to produce a relative turning between the heat producing means and the rotary detent, when the heat susceptible material is softened, a pivoted arm G upon the distal end of which are mounted the parts capable of self return to operative condition preparatory to manual restoration to normal condition of the structure as a whole, and means for limiting the swing of said arm.

12. In an electrical circuit protector, the combination of a heat concentrating device, a wheel having a plurality of teeth, a solder joint normally holding said wheel against movement, a strip spring adapted to engage the teeth of said wheel, whereby upon the passage of an unduly strong current in the device, the heat concentrating device softens the solder and permits the wheel to be turned to release the spring and resets the wheel in position to re-engage the spring, the wheel being automatically resoldered after operation in such reset position, a pivoted arm G upon the distal end of which are mounted the parts capable of self return to operative condition preparatory to manual restoration to normal condition of the structure as a whole, and a plate A upon which all said parts are mounted.

13. In an electrical controller comprising thermally operable securing means releasable on a change in electrical circuit conditions, having provisions whereby it is automatically resecured in operable condition preparatory for another operation, the pivot F, the arm G mounted on said pivot, and the spring $g^5$ carried by the distal end of said arm, adapted to ensure self return of the parts to operative condition preparatory to manual restoration to normal condition of the structure as a whole.

14. In apparatus of the class specified, the combination of a heat producing means, a rotary detent normally held against rotation by a heat susceptible material, circuit controlling means adapted to produce a relative turning between the heat producing means and the rotary detent, when the heat susceptible material is softened, the pivot F, the arm G mounted on said pivot, the spring $g^5$ carried by the distal end of said arm, adapted to ensure self return of the parts to operative condition preparatory to manual restoration to normal condition of the structure as a whole, said rotary detent engaged by said spring $g^5$, for the purpose set forth.

15. In an electrical circuit protector, the combination of a heat concentrating device, a wheel having a plurality of teeth, a solder joint normally holding said wheel against movement, a strip spring adapted to engage the teeth of said wheel, whereby upon the passage of an unduly strong current in the device, the heat concentrating device softens the solder and permits the wheel to be turned to release the spring and resets the wheel in position to re-engage the spring, the wheel being automatically resoldered after operation in such reset position, the pivot F, the arm G mounted on said pivot, the spring $g^5$ carried by the distal end of said arm, adapted to ensure self return of the parts to operative condition preparatory to manual restoration to normal condition of the structure as a whole, said wheel engaged on its under side by said spring $g^5$, for the purpose set forth.

16. In a device of the class specified, the combination of a toothed metal wheel, a metal support for said wheel, solder between said support and wheel, a heat generating resistance associated with said solder, spring means for keeping the wheel and support pressed tightly together to exclude the air from said solder, and means for engaging the teeth of said wheel to exert spring pressure thereon and close circuit through said resistance.

17. A device of the class specified, comprising self-soldering means provided with a plurality of axes of movement, one axis adapted to swing about the other to facilitate resetting of said device, and suitable parts movable about said axes.

18. A self-soldering electro-thermal switch comprising a bodily movable toothed wheel, solder for normally holding the wheel against rotation, a spring engaging a tooth of said wheel, adapted to engage any other tooth should the wheel be rotated, a suitable resistance associated with said solder, a circuit for passing electric current through said resistance, and means for effecting the bodily movement of the toothed wheel, said solder adapted to be fused by heat generated by said resistance.

Signed by me at Chicago Ill this 12th day of Oct 1904.

JOHN ERICKSON.

Witnesses:
CLARENCE M. THORNE,
JENNIE NORBY